Aug. 22, 1933. P. B. WHITNEY 1,923,523
AUTOMATIC SIGN
Filed June 4, 1932 3 Sheets-Sheet 1
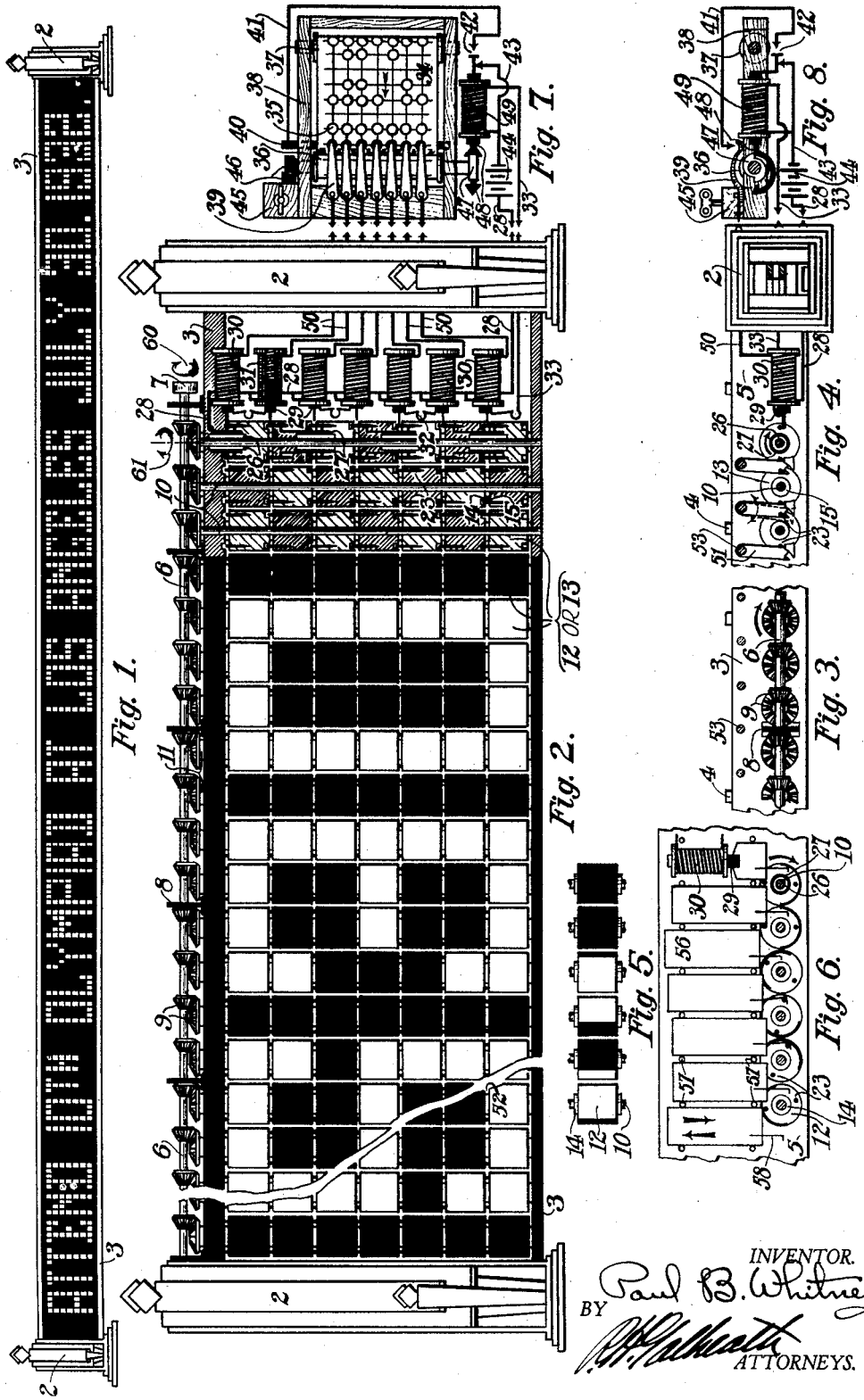
INVENTOR.
Paul B. Whitney.
BY
ATTORNEYS.

Aug. 22, 1933. P. B. WHITNEY 1,923,523
AUTOMATIC SIGN
Filed June 4, 1932 3 Sheets-Sheet 2
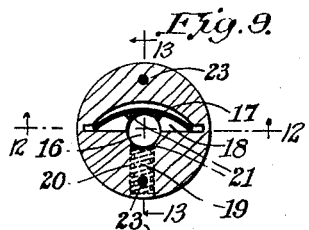
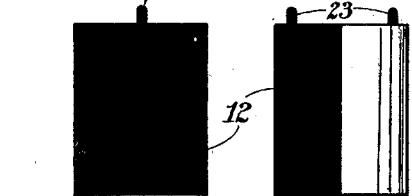
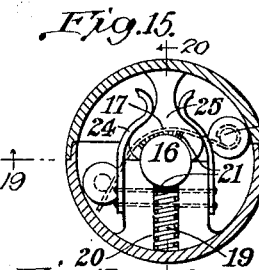
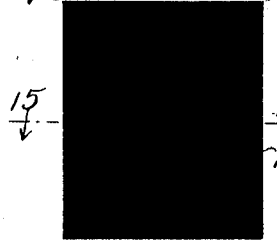
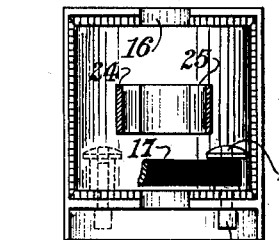
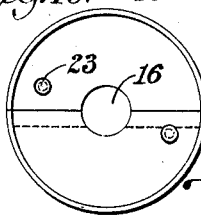
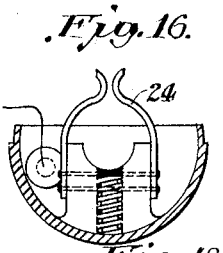
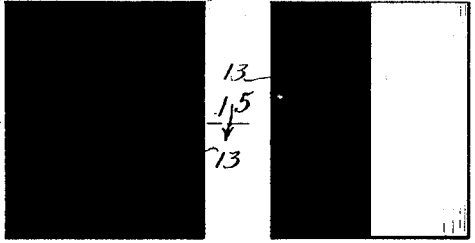
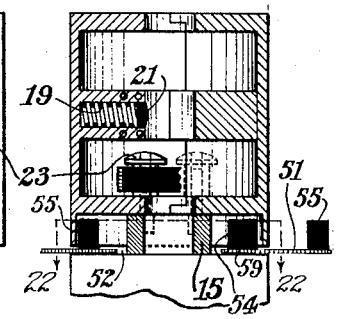
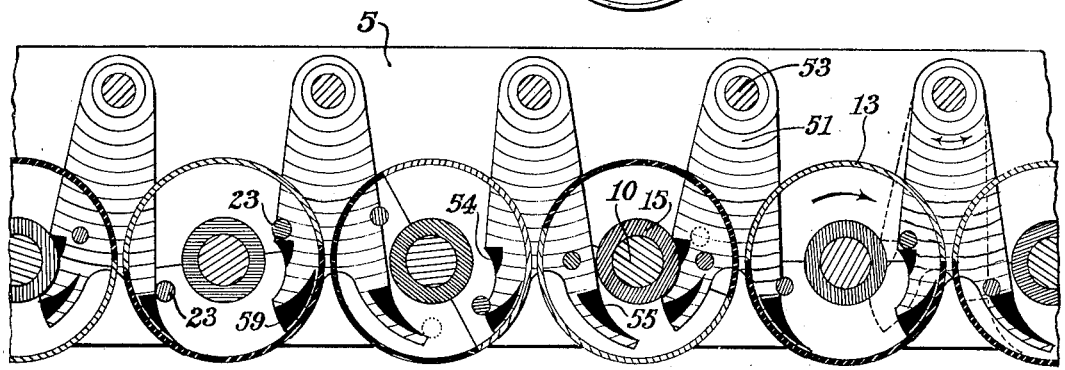

Aug. 22, 1933.    P. B. WHITNEY    1,923,523
AUTOMATIC SIGN
Filed June 4, 1932    3 Sheets-Sheet 3
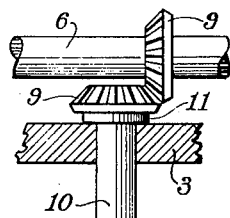
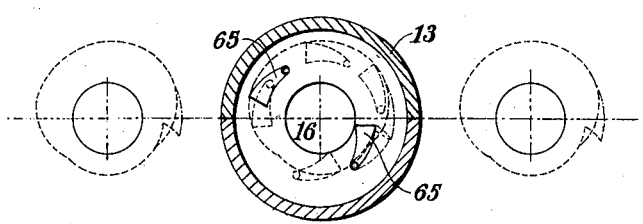
Fig. 24.
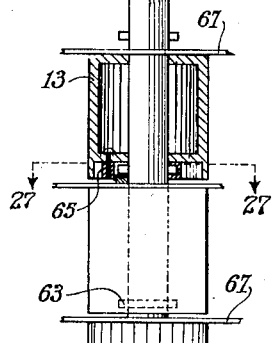
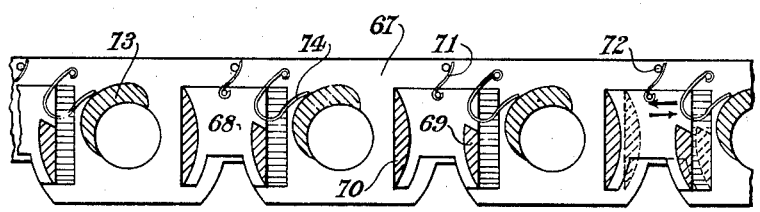
Fig. 25.
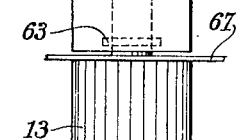
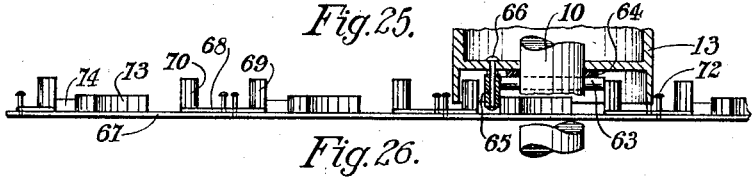
Fig. 26.
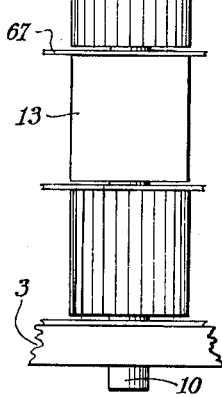
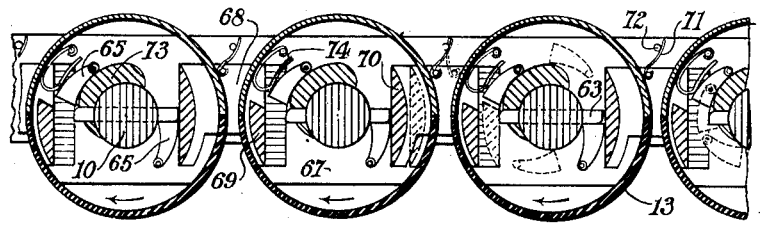
Fig. 27.
Fig. 23.
INVENTOR.
Paul B. Whitney
BY
ATTORNEYS.

Patented Aug. 22, 1933

1,923,523

UNITED STATES PATENT OFFICE 1,923,523

AUTOMATIC SIGN

Paul B. Whitney, Santa Monica, Calif.

Application June 4, 1932. Serial No. 615,405

12 Claims. (Cl. 40—52)

My invention relates to a changeable or automatically moving sign or signboard, for operation by means of near or remote control.

It applies to signs more particularly of value for direct daylight advertising and for night advertising by means of external flood lighting. Its compactness renders it a highly efficient utilizer of space, capable of construction for operation, in small form for window display, in intermediate size, and in large proportions for billboard, roof top or mountainside display, thus having a wide range of advertising value. The size of such a sign is of any desired height and length, said dimensions being solely dependent upon the size and number of sign forming elements used.

The principal object of my invention is to construct a sign of this character with a multiplicity of dual colored, inter-dependent sign forming elements with controlled display of the proper light and dark faces of said elements so that letters, figures, numbers, words, sentences, phrases, characters or patterns may be quickly formed and assembled at one end of the sign and made to move laterally in a continuous stream across the sign and vanish at the other end, in a manner similar in effect to moving a line of news print laterally behind a small rectangular opening in front of the eye.

Another object of my invention is to provide a quick means for automatically forming and controlling such letters or figures of block letter appearance, from an arrangement of light and dark faces or surfaces of relatively small area extent.

There are several existing means for forming block letter signs from an arrangement of light and dark areas, but such signs are usually of a fixed or stationary character, or if at all changeable, they are only so in the sense that the rearrangement of light and dark areas or faces is achieved by shifting them individually by hand, finger or pointer. Signs of vari-colored tile in tile floors are an illustration. There are also existing signs constructed of a multiplicity of luminous electric light bulbs which permit formation and motion of words and sentences laterally across said signs, by turning the current progressively on and off thru said bulbs. Such signs however are only suited for display in the dark. In my invention I have discovered a means of quickly and automatically forming said letters, words and sentences and setting them in motion, using non-luminous vari-colored elemental faces, thus creating a new type of sign easily visible in bright sunlight or in the dark by floodlighting from external means.

It is still another object of my invention to attract and hold the public eye, as action commands attention. Constant conspicuous travel of news items, interspersed with advertising matter as viewed from street or sidewalk, or visual announcing of important events, messages, results or scores at assemblies, football games, baseball games, races, track meets or at other large public gatherings, serve to hold the attention of the most unwilling observer because of the lure of anticipation of "What's coming next?".

It is still another object of my invention to provide a quick means of visually transmitting thought and information short and long distances in daylight and darkness to large gatherings of people where the noise and clamor of applause from the excited, enthusiastic crowd render audible loud speaking devices decidedly ineffective. Likewise another object is to provide a means for precision announcing. Correct spelling as displayed by my invention for visual announcing leaves the observer with no misunderstanding, whereas incorrect pronunciation, lisping, peculiar accent, inflection or stumbling of the announcer over loud speaking devices of public address systems often leaves the hearer in a quandary as to what was announced.

It is still another object of my invention to provide a sign of stationary advertising value when not actively operated as a moving sign. While action or motion, slow or fast, particularly characterize my sign, with an expenditure of energy to sustain such action or motion, the sign may be quickly made stationary with any advertising item appearing thereon as a fixed sign, without any energy expenditure during its fixed state. The sign may also be left wholly blank if so desired.

Other objects and advantages reside in the detailed construction of my invention which is designed for simplicity, economy and efficiency. The use of standard mechanical parts, the freedom from excessive use of specially fabricated parts, the absolute freedom from use of an intricate electrical wiring system, the ease of assembly and numerous other objects and virtues of my invention will be made manifest in the following detailed description and reference is made to the accompanying drawings which form a part hereof and whereon is portrayed the practical embodiment of the details of my invention. It is understood that modifications and variations may be resorted to within the spirit and scope of the invention.

Like numerals refer to like parts in all views of the drawings and throughout the description.

In the drawings:—

Fig. 1 is a front elevation of the assembled sign or signboard with an important message displayed and travelling on the sign from right to left.

Fig. 2 is a magnified front elevation of the assembled sign or signboard showing construction details. The letter "S" and number "30" are displayed thereon.

Fig. 3 is a top horizontal view of a section of Fig. 2 showing shafting and gearing.

Fig. 4 is a top horizontal view of end support and section of a top view above any horizontal row of sign or letter forming elements in Fig. 2, showing a form of construction for automatic translation of rotation from one element to the next element.

Fig. 5 is a front vertical view of a row of sign or letter forming elements from Fig. 2 showing full and portional light and dark faces in arbitrary positions.

Fig. 6 is a top horizontal view of Fig. 5 showing another form on construction for automatic translation of rotation from one element to the next element.

Fig. 7 is a top horizontal view of my near or remote control automatic transmitting device.

Fig. 8 is a front vertical view of Fig. 7.

Fig. 9 is a plan view of a solid form of letter forming element.

Figs. 10 and 11 are front and side elevations, respectively, of the solid form of element of Fig. 9.

Figs. 12 and 13 are vertical sections taken on the lines 12—12, and 13—13, respectively, Fig. 9.

Fig. 14 is a bottom view looking upwardly at the solid form.

Fig. 15 is a horizontal section through an alternate, hollow form of letter forming element, taken on the line 15—15, Fig. 17.

Fig. 16 is a similar sectional view illustrating a detached one-half of the hollow form of element.

Figs. 17 and 18 are front and side elevations respectively, of the form of Fig. 15.

Figs. 19 and 20 are vertical sections through the hollow form, taken on the lines 19—19 and 20—20, Fig. 15, respectively.

Fig. 21 is a bottom view of the hollow form of letter forming element.

Fig. 22 is a magnified view of Fig. 4 and a horizontal section taken on the line 22—22 of Fig. 20 showing a magnified view of a form of construction for automatic translation of rotation from one element to the next element.

Fig. 23 is one vertical column of sign forming elements showing another form of construction for automatic translation of rotation from one element to the next element.

Fig. 24 is a horizontal section through an element of Fig. 23, taken on the line 27—27, Fig. 23.

Fig. 25 is a plan view a separator strip of the type employed in Fig. 23.

Fig. 26 is a front elevation of the separator strip of Fig. 25.

Fig. 27 is a horizontal section through several elements taken on the line 27—27, Fig. 23, showing the assembled stopping and releasing mechanism.

*General construction*

The term sign forming element or letter forming element as hereinbefore used and the term 'element' as hereinafter used is intended to include only one of the dual-colored units of the sign such as illustrated in Figs. 10, 11, 17 and 18. While the horizontal cross section of said elements may be varied from cylindrical to triangular, square, rectangular, polygonal or to thin two faced slats, with an adaptation of as many or less different colors for the vertical faces as there are sides or faces, and while the vertical cross section of said elements may be varied from square to polygonal or circular the cylindrical element of square or rectangular vertical cross section, with 180 degrees of its vertical circumferential face colored light and the other 180 degrees of its vertical circumferential face colored contrastingly dark as herein illustrated is the preferable and most practical form for both construction and operation.

The term 'column' as used herein is intended to include only one vertical set of elements, with assembly, when assembled on one vertical shaft. The first column is at the extreme right of the sign and columns are referred to as second, third, fourth etc. consecutively to the left from the first column.

The term "row" as used herein is intended to include all elements lying side to side in the same horizontal row. The first row is the top row and rows are referred to as second, third, fourth etc, consecutively downward from the first row.

My invention is therefore incorporated in a sign or signboard, including a frame having vertical end supports designated by numeral 2, horizontal top and bottom supports 3, intermediate vertical supports 4 and intermediate horizontal supports 5, to receive the operating shafting, operating mechanism, assembled columns and elements.

A longitudinal shaft 6 with gear or pulley wheel 7, and supported by shaft hangers 8, is connected through means of bevel gears 9 or worm gears or other driving means to the numerous vertical shafts 10. On shafts 10, which are suspended through bearings 11, are mounted elements 12 or 13 separated individually by washers 14 or 15 respectively.

Hole 16 in elements 12 and 13 is a loose fit to shafts 10. As illustrated in Figs. 9 and 10, a flat spring 17 in recess 18, or a coiled spring 19 in chamber 20 in elements 12 or 13 provide a properly balanced frictional action between said elements and shafts 10. A small piece of brake lining 21, between springs 17 or 19 and shafts 10 prevent frictional wear of metal between springs and shafts.

The solid form of element, 12, as preferably illustrated in Fig. 9 has a circular groove 22 in its base to permit upper ends of pins 23 of the next lower element to freely rotate within said groove. Pins 23 of which there are two for each element are rigidly fixed to said element as illustrated.

The hollow form of element, 13, as preferably illustrated in Figs. 15 to 21, inclusive may be made in two sections horizontal or vertical. The vertical form only is illustrated and comprises two halves which may be screwed together or which may be clipped together by clip springs 24 on the one half, gripping the rounded section 25 on the other half.

In Fig. 2, the columns are shown as seven elements high. This is a convenient number in height to form one line of nice appearing block letters and figures, but columns comprising more or less than seven elements in height may be used to meet any desired requirement.

All columns and elements for any one sign or signboard are alike in construction and assembly excepting the elements in the first column only. In the top of alternate elements in the first column only, are attached an inner non-metallic, insulator sleeve 26, loosely fitting shaft 10, and a metallic conductor sleeve 27, externally fitting sleeve 26. These sleeves extend upward into the base of the next higher element and freely rotate within it. Sleeve 27 is thus electrically insulated from shaft 10 by sleeve 26. Sleeve 27 of the element in the third row is in constant sliding electrical contact with pins 23 of the elements in the second and third rows. Likewise sleeve 27 of the element in the fifth row contacts pins 23 of elements in the fourth and fifth rows. Likewise sleeve 27 of the element in the seventh row contacts pins 23 of elements in the sixth and seventh rows.

Sleeve 27 of the element of the first column of the first row only, is fixed to and rotates with shaft 10 and rotates within its element and is in constant sliding electrical contact with pins 23 of said element. This particular one sleeve only makes electrical contact with external circuit wire 28 once for every half revolution of shaft 10 of the first column.

Pins 23 of the elements in the first column only, engage with and make electrical contact with mechanical stops or plungers 29 of solenoids or electromagnets 30. Plungers 29 are not electrically connected with the windings of their respective solenoids 30. Coiled plunger spring 31 is inserted back of plunger 29. Plungers 29 of solenoids 30 in the first and second rows are electrically connected by a short flexible wire 32. Likewise plungers 29 of the solenoids 30 in the third and fourth, and also the fifth and sixth rows are similarly connected by wires 32. Plunger 29 of solenoid 30 in the bottom or seventh row is in constant electrical contact with external circuit wire 33.

While various means for mechanical or electrical tripping or releasing pins 23 of elements in the first column might be adapted, my preferred means of near or remote transmitting control is illustrated in Fig. 7. Letters, words, messages etc., are previously formed in perforated form on a roll of perforated paper 34 with perforations 35 therein. Said roll is wound on reels 36 and 37, these reels being contained in frame 38. Metallic spring contact fingers 39 contact through perforations 35 with contact bar 40 which is fixed in frame 38. Contact bar 40 is connected by circuit wire 41 with solenoid plunger switch 42. Plunger switch 42 is connected by circuit wire 43 to storage battery or other source of current 44. Spring or motor mechanism in 45 operates reel 36 through gears or driving means 46 and provides constant winding tension on reel 36. Ratchet escapement wheel 47 on reel 36 engages with solenoid escapement plunger 48 of solenoid or electromagnet 49.

Solenoid 49 is in circuit with circuit wire 43, battery 44, circuit wire 28, sleeve 27 of the top element of the first column, pins 23, plunger 29, flexible wire 32, plunger 29, and so on down to plunger 29 in the seventh row, which is connected by circuit wire 33 to solenoid 49.

The solenoids 30 are connected in parallel and are connected with their respective spring contact fingers 39 by their individual circuit wires 50. The circuit established is from solenoid 30, through circuit wire 50, contact finger 39, bar 40, circuit wire 41, plunger switch 42, circuit wire 43, battery 44, circuit wire 28 back to solenoid 30.

A preferred form of control for translation of rotation for hollow elements 13, in Figs. 4 and 11, provides for a stop lever 51 which has a vertical thickness thin enough to freely slide in space 52 between top and bottom of elements. Stop lever 51 which oscillates slightly on shaft 53 is fitted with a stop lug 54, a release lug 55, and a replace lug 59. In hollow element construction pins 23 are fixed preferably on the base of each element and approximately on the element diameter separating light and dark faces. In hollow element operation solenoids 30 lie preferably parallel to the face of the signboard.

A preferred form of control for translation of rotation for solid elements 12, in Fig. 6, provides for a stop key 56 which has a vertical thickness less than washer 14. Stop key 56 which slides smoothly on support 5 and freely between vertical guides 57 is provided with a spring wire catch 58 which engages with pins 23. In solid element construction pins 23 are fixed preferably on the top of each element and approximately at right angles to the element diameter separating light and dark faces. In solid element operation, solenoids 30 lie preferably at right angles to the face of the signboard.

A preferred form of control for translation of rotation for elements 12 or 13, provides for pins 63 which are rigidly fixed to or through shafts 10. Elements 12 or 13 rest on washers 64 which in turn rest on pins 63. The preferred form of element 13 for this type of construction is provided with dogs 65 instead of pins 23 as previously provided, and the frictional contact with shaft 10 as previously provided by means of springs 19 is dispensed with. Dogs 65 are fixed to elements 13 by pins 66. Separator strip 67 is provided with a sliding plate 68 on the ends of which are rigidly fixed lugs 69 and 70. Spring 71 connected to plate 68 maintains constant pressure on pin 72 which is rigidly fixed to strip 67. Cam 73 is rigidly fixed to strip 67. Spring 74 fixed to strip 67 provides frictional or binding action between cam 73, dogs 65 and the inner surface of the lower edge of element 13.

*General operation of the signboard*

After assembly, while it is possible to expose all light faces of the elements and form letters etc., from exposure of dark faces of the proper elements, thus having dark letters on a light background, or, while it is also possible to expose all dark faces of the elements and form letters etc., from exposure of light faces of the proper elements, thus having light letters on a dark background, let the latter arrangement be assumed for description of operation.

The sign or signboard is assembled as in Fig. 2 with dark faces of all of the elements turned to the front, and the pins 23 stopped by stop lugs 54 or stop keys 56 with pins 23 of the elements of the first column stopped by the extended plungers 29 of the solenoids 30.

The sign is now ready for action. Power is applied by gear, belt, chain or direct connection at gear 7 and continuously rotates shaft 6 in direction of arrow 60 which shaft in turn continuously rotates shafts 10 through gears 9 in a clockwise direction as arrow 61 indicates. The many shafts 10 are now continuously rotating within all elements, but all elements remain stationary being prevented from rotating by pins 23 against their stops.

The letters or message to be created upon the sign has been prepared by suitable means and is in the form of perforations 35 on the perforated roll 34 and said roll has been placed on reels 36 and 37 of Fig. 7 and is ready for operation. The perforated roll will move in the direction of the arrow thereon, and as illustrated in Fig. 7 the roll has been perforated to transmit the number nineteen (19) in figure form to the sign in Fig. 2. On roll 34 will be observed eight vertical lines of possible perforations with each line possible of seven perforations corresponding to the seven solenoids 30 and the seven elements comprising the columns. The first line with seven perforations thereon, the left hand line, is shown as over contact bar 40 and under spring contact fingers 39.

At moment A, meaning a point of time, with shafts 10 still rotating, current from battery 44 is permitted to flow through all possible circuits. As all plungers 29 are in contact with pins 23 a closed circuit exists and current passes from battery 44, through circuit wire 28, top conductor sleeve 27, pin 23, plunger 29 of top solenoid 30, to flexible wire 32, thence in a zigzag path downward, plunger to pin to sleeve to pin to plunger to flexible wire and so on to plunger 29 of bottom solenoid 30 then through circuit wire 33 through solenoid 49 and circuit wire 43 back to battery 44. Therefore at moment A, escapement plunger 48 is pulled in closing plunger switch 42 thus causing another closed circuit and current now flows from switch 42 through circuit wire 43, battery 44, circuit wire 28, through each of the seven solenoids 30, through circuit wires 50, contact fingers 39, contact bar 40, circuit wire 41 back to switch 42. Immediately then, at moment A plus all plungers 29 are drawn in, releasing pins 23, and all elements of the first column because of friction of springs 17 or 19, turn with shaft 10 bringing their light faces gradually into full view at moment B. The time lapse between any moment A and any moment B is the time required for shafts 10 to rotate through 180 degrees.

Also at moment A plus, spring 45 turns reel 36 pulling ratchet escapement plunger 48 outward thus stopping the second line of perforations 35 over bar 40, and at the same time breaking contact at switch 42 thereby permitting springs 31 to push plungers 29 outward to stop the second set of pins before the moment B.

At moment B, contacts are again similarly made which at moment B plus result in again pulling in all plungers 29 since the second line of roll 34 is fully perforated with seven perforations. Thus all elements of the first column again turn with shaft 10 bringing their dark faces gradually into full view at moment C. The full light faced column representing number one (1) of the nineteen (19) was passed on to the second column at moment B.

At moment C, contacts are again made, but the third line of roll 34 which is now over bar 40 has no perforations, thus at moment C plus no contacts are made between bar 40 and fingers 39; thus plungers 29 do not release pins 23, thus the first column retains the same dark appearance at moment D as it had at moment C; thus a second columnar dark space is set up between the (1) and the oncoming (9). As is illustrated in Fig. 1, there is but one dark space between the (1) and the (9).

At moment C however, current must be broken through solenoid 49, but plungers 29 have not moved to break the current so sleeve 27 of the top element does do so since it contacts circuit wire 28 every half revolution of shaft 10.

The current thus broken permits escapement wheel 47 to withdraw plunger 48 with no resisting pull from solenoid 49 and thus the fourth line of perforations arrives over contact bar 40.

At moment D contacts are made and at moment D plus all plungers are pulled in excepting plunger 29 of the fifth row, because of no corresponding perforation on the fifth row of the fourth line. Therefore at moment D plus the fifth row element of the first column remains dark and stationary while the other six elements rotate their light faces into full view at moment E, thus creating the left edge of the number nine (9).

At moment E plus the fifth line of perforations permits a change from light to dark faces on elements of the second, third and sixth rows only. The others of the first, fourth and seventh rows whose faces were turned light at moment D plus, remain so at moment E plus so that at moment F, the left center quarter of the number nine (9) is created on the first column.

At moment F, the sixth line, a line of no perforations is over bar 40 and at moment F plus no motion results in the first column thereby retaining at moment G the full appearance it had at moment F, as the left center quarter and right center quarter of the number nine (9) are identical in appearance.

At moment G the seventh line is over bar 40 and as the second, third and fifth rows are perforated, the second, third and fifth row elements of the first column turn their light faces to the front at moment G plus, coming into full view at moment H. Thus at moment H, the first column is full light faced and the right hand edge of the number nine (9) is created.

At moment H, the eighth or last line of perforations is over bar 40. This line is fully perforated and at moment H plus, all elements of the first column start to turn their dark faces to the front.

At moment B plus, the set up on the first column transfers its full appearance to the second column by action of levers 51 or keys 56 releasing the proper elements. Likewise at moment C plus the set up on the second column transfers its full appearance to the third column and the set up on the first column transfers its full appearance to the second column, and the perforations over bar 40 at the moment C govern the set up to then be created on the first column at moment C plus.

Therefor at the moment H, the full number nineteen (19) in figure form appears upon the sign, occupying columns from the seventh column to the first column inclusive. If no further number or message is to follow, the (19) will continue to travel laterally across the signboard and vanish at the left end, leaving the dark faces of all elements exposed in its wake. By cutting power off at gear 7 with the number

(19) in any position on the sign would leave the number stationary thereon with a fixed sign appearance. Upon application of power again at gear 7 the number (19) would immediately start its lateral trek again and vanish at the left end of the sign.

The object in requiring the many contacts of pins 23 and plungers 29 at the same time for circuit closing is to insure a vertical lineup of the lines separating the light and dark faces of all elements on the first and succeeding columns during rotation.

It will be noted that the width of letter or figure remains visibly constant and uniform regardless of the angular position of rotating elements. For illustration, assume the number one (1). When fully exposed as full light faces on elements of the first column, it is of completed width. When the first column has further rotated, say 90 degrees, exposing half a light faced column on its left, the second column has also rotated 90 degrees exposing half a light faced column on its right, or the full 180 degrees of light face is visible. When the first column further rotates leaving only, say 50 degrees of light face on its left, the second column has advanced, exposing 130 degrees of light face on its right, or a total visible width of 180 degrees. The slight space between columns is scarcely noticeable even in small signs at short distance.

Translation of rotation, laterally from one element 12 to the next element 12 for the solid form of element is explained by reference to Fig. 6. The suffix A, B, C etc., is used to designate units of the assembly in Fig. 6, with A denoting the right hand unit, thus keys 56A to 56G inclusive, and elements 12A to 12F are shown. The dark faces of elements 12A to 12F are exposed as in Fig. 5 and as correspondingly indicated by the dark half-circumference in Fig. 6.

It is understood that shafts 10 are continuously rotating. Sliding key 56A, joined to plunger 29 of solenoid 30 is in its forward position stopping rotation of element 12A by pin 23 pressing against the lower left hand edge of key 56A. Element 12B is also in stopped condition with pin 23 stopped by the edge of key 56B. The same pin 23 of element 12B has just pushed back key 56C and thus released pin 23 of element 12C, which element has rotated about 30 degrees to the position shown. When it has rotated about 120 degrees as in the position of element 12E, its pin 23 then engaged with spring wire catch 58 will have pulled key 56C into full forward position as keys 56A, 56B, 56E, 56F. Pin 23 of element 12E is about to push back key 56F, after which, element 12E will be stopped by key 56E. Pin 23 of element 12F has just pushed back key 56G.

Starting with the arbitrary position of units as shown in Fig. 6, motion will ensue until all elements have exposed their dark faces to the front, then rotation will stop, unless another impulse issues from key 56A.

Translation of rotation laterally from one element 13 to the next element 13 for the hollow form of element is explained by reference to Fig. 22. The suffix A, B, C, etc., is used to designate units of the assembly in Fig. 22, with A denoting the right hand unit, thus levers 51A to 51E inclusive, and elements 13A to 13F are shown. The dark faces of elements 13A to 13F are exposed as indicated by the dark half-circumference.

It is understood that shafts 10 are continuously rotating. The upper right pin 23 of element 13B, is shown as stopped by stop lug 54A, thus preventing rotation of element 13B. The lower left pin 23 of element 13B has just pushed lever 51B to the left, by sliding lever action against the side of release lug 55B, thus releasing pin 23 from stop 54B and permitting element 13C to rotate about 10 degrees to the position shown. The right hand pin 23 of element 13C, having progressed from its former dotted position is about to strike replace lug 59B, and upon doing so and further reaching a position similar to pin 23 of element 13B against lug 59C, it will have replaced lever 51B to the similar stop position of 52A.

The dotted pin 23 on element 13D is in position to start pushing 51D laterally by sliding lever action along the edge of lug 55D and will have completed the release of pin 23 at lug 54D when it has reached a position similar to the left hand pin 23 of element 13E, then element 13E will start rotating.

Starting with the arbitrary position of units as shown in Fig. 22, motion will ensue until all elements have exposed their dark faces to the front, then rotation will stop unless another impulse arrives to element 13A.

The mechanical result obtained by stop lever 51 can also be achieved by another means, as, for example with a sliding lever, sliding left and right on a guide joining washers 15A and 15B, and also 15B and 15C etc., using much the same form of lugs on said lever as 54, 55 and 59, and this alternate type of lever may be desirable for certain types of sign.

Translation of rotation laterally from one element to the next element for a positive means of control is explained by reference to Figs. 23 to 27, inclusive.

In the positive means of control, pins 63 are in perfect alignment for each column and for all columns, and thus at all times during rotation of shafts 10 all pins 63 are in synchronous positions of orientation. Each pin 63 supports one element 13 above washer 64, and the hole 16 in element 13 is in a loose fit for shaft 10.

Rotation of elements 13 is imparted from right to left by the left-hand dog 65 of any element being forced radially outward by contact with cam 73. Dog 65 thus presses against lug 69, forcing plate 68 to the left, causing lug 70 to press against the right-hand dog 65 of the next element to the left, pushing dog 65 inward until engaged with the oncoming right-hand end of pin 63, whence the element then rotates 180 degrees until dog 65 is disengaged with pin 63 by action of cam 73. When elements are in the stop position as shown in Fig. 27, springs 71 force plate 68 to the right and keep it to the right until a dog 65 strikes lug 69,— thus an outwardly forced dog 65 by cam 73 remains in its outward position during rotation of element 13 through 180 degrees. When both dogs 65 are in an outward position, element 13 remains stationary by clamping action of spring 74 between the element, the dog 65 and the cam 73, while the shaft 10 and pins 63 continuously rotate within the element 13. A new impulse forcing lug 70 against dog 65 again starts element 13 rotating in unison with shaft 10. The path of the outer front corner of dogs 65 is shown by the dashed curves on Fig. 13.

In this positive means of translation of rotation control as with previously described means it is to be understood that shafts 10 are continuously rotating during the active operation of the signboard.

This form of construction permits a positive means of control of translation of rotation, by a positive locking of elements 13 to shafts 10 during rotation of shafts 10 and is not dependent upon the frictional hold of elements 13 on shafts 10 as previously provided by springs 19.

While a preferred form of positive control of translation of rotation has been illustrated and described, the same result can be achieved by other arrangement such as dogs operating in a vertical plane instead of in the horizontal plane as shown, or by replacing the dogs with stop lugs made to slide radially in and out. Likewise other forms of sliding or oscillating means may be substituted to accomplish the function of plate 68 with its lugs 69 and 70.

While the general or specific form of moving sign or signboard has been described and illustrated herein, it is desired to be understood that the same may be varied within the scope of the appended claims without departing from the spirit of the invention.

Having thus described the invention, what is claimed and desired secured by Letters Patent is:—

1. A changeable sign comprising a multiplicity of rotatable blocks positioned in common plane to form a sign face, said blocks arranged in vertical and horizontal rows; vari-colored faces on opposite sides of said blocks; means tending to rotate said blocks in a common direction; stop means holding each of said blocks with one of said faces outward; means for releasing said stop means to allow said blocks to rotate to a position to expose the other of said faces, there being an individual stop means for each of said blocks; and means carried by each of said blocks for releasing the stop means of the next adjacent block so that said blocks will be released in succession across said sign face.

2. A changeable sign comprising a multiplicity of rotatable blocks positioned in common plane to form a sign face, said blocks arranged in vertical and horizontal rows; vari-colored faces on opposite sides of said blocks; means tending to rotate said blocks in a common direction; a stop member coacting between adjacent blocks; so that the rotation of one block will actuate said stop member to release the next adjacent block successively across said sign face.

3. A changeable sign comprising a multiplicity of rotatable blocks positioned in common plane to form a sign face, said blocks arranged in vertical and horizontal rows; vari-colored faces on opposite sides of said blocks; means tending to rotate said blocks in a common direction; stop pins projecting from the transverse face of each of said blocks; a stop member between each pair of adjacent blocks coacting with said pins and positioned so that as one block completes a 180° rotation one of its stop pins will actuate the next adjacent stop member to release the next adjacent block.

4. A changeable sign comprising a multiplicity of rotatable blocks positioned in common plane to form a sign face, said blocks arranged in vertical and horizontal rows; vari-colored faces on opposite sides of said blocks; means tending to rotate said blocks in a common direction; stop pins projecting from the transverse face of each of said blocks; a stop member between each pair of adjacent blocks coacting with said pins and positioned so that as one block completes a 180° rotation one of its stop pins will actuate the next adjacent stop member to release the next adjacent block, said stop members being arranged to return to their normal positions after each actuation so as to engage said stop pins and stop the rotation of said blocks.

5. A changeable sign comprising a series of rotating, parallel shafts positioned in a common plane; a column of independent sign elements positioned along each of said shafts, in frictional engagement therewith so as to form a sign face consisting of vertical columns and horizontal rows of elements; a vari-colored opposite faces on said elements; a stop member between the adjacent elements in each vertical column extending between the elements of the next adjacent column; stop pins projecting from each element and adapted to contact with the two horizontally adjacent stop members so that the rotation of each element will actuate the next adjacent stop member to cause the latter to release the next adjacent element successively throughout a row of elements.

6. A changeable sign comprising a series of rotating, parallel shafts positioned in a common plane; a column of independent sign elements positioned along each of said shafts, in frictional engagement therewith so as to form a sign face consisting of vertical columns and horizontal rows of elements; vari-colored opposite faces on said elements; a stop member between the adjacent elements in each vertical column extending between the elements of the next adjacent column, said stop members being hinged to swing in horizontal arcs; a stop lug on each of said stop members; a release lug on each of said stop members; a pair of stop pins projecting from each of said elements and arranged so that as one element rotates one of its pins will engage the release lug of the adjacent stop member so as to actuate the latter to cause its stop lug to release the stop pin of the next adjacent element, successively along a row of said elements.

7. A changeable sign comprising a series of rotating, parallel shafts positioned in a common plane; a column of independent sign elements positioned along each of said shafts, in frictional engagement therewith so as to form a sign face consisting of vertical columns and horizontal rows of elements; vari-colored opposite faces on said elements; a stop member between the adjacent elements in each vertical column extending between the elements of the next adjacent column, said stop members being hinged to swing in horizontal arcs; a stop lug on each of said stop members; a release lug on each of said stop members; a pair of stop pins projecting from each of said elements and arranged so that as one element rotates one of its pins will engage the release lug of the adjacent stop member so as to actuate the latter to cause its stop lug to release the stop pin of the next adjacent element, successively along a row of said elements; and a replace lug on each of said elements adapted to be engaged by said stop pins as each element rotates to restore said stop member to its former position so that said stop lug may stop the rotation of said element after a predetermined interval.

8. A changeable sign comprising a plurality of horizontal rows of rotatable sign elements, the opposite faces of each of said elements being differently colored; stop members positioned between the adjacent elements in each row and adapted to stop the rotation of said elements as each of their faces are exposed; means for successively releasing the stop members along each horizontal row so that the individual elements in said row will successively rotate throughout the length of said row; and means for releasing the initial element in each row.

9. A changeable sign comprising a plurality of horizontal rows of rotatable sign elements, the opposite faces of each of said elements being differently colored; stop members positioned between the adjacent elements in each row and adapted to stop the rotation of said elements as each of their faces are exposed; means for successively releasing the stop members along each horizontal row so that the individual elements in said row will successively rotate throughout the length of said row; and means for releasing the initial element in each row, said latter means comprising a solenoid arranged to actuate the initial element of each row at desired intervals.

10. A changeable sign comprising a plurality of horizontal rows of rotatable sign elements, the opposite faces of each of said elements being differently colored; stop members positioned between the adjacent elements in each row and adapted to stop the rotation of said elements as each of their faces are exposed; means for successively releasing the stop members along each horizontal row so that the individual elements in said row will successively rotate throughout the length of said row; and means for releasing the initial element in each row, said latter means comprising a solenoid arranged to actuate the initial element in each row at desired intervals; a circuit closer in circuit with said solenoid; and a perforated tape arranged to open and close said circuit closer at desired intervals.

11. A changeable sign comprising a plurality of rows of rotatable sign elements, the opposite faces of said elements having different visual characteristics; means for rotating said elements; means for individually stopping the rotation of said elements as each of the faces are exposed; means for successively releasing the stopping means along each row of elements so that the individual elements in each row will successively rotate throughout the length of that row; and means for selectively releasing the initial elements in each row.

12. A changeable sign comprising a plurality of rows of rotatable sign elements the opposite faces of which have different visual characteristics; rotating means tending to rotate said elements; an individual stop member for each of said elements to stop the rotation thereof as each of its faces is exposed; and a stop releasing member carried by each element, each of said stop releasing members acting to release the stop member of the next adjacent element as the first element completes its rotation so that said elements will successively expose their opposite faces across said sign; and means for selectively imparting rotation to the initial element in each row.

PAUL B. WHITNEY.